United States Patent [19]

Verstraete

[11] Patent Number: 5,170,353
[45] Date of Patent: Dec. 8, 1992

[54] BUCKET-ORIENTED ROUTE PLANNING METHOD, AND NAVIGATION SYSTEM COMPRISING A ROUTE PLANNER FOR CARRYING OUT SUCH A METHOD

[75] Inventor: Rik A. Verstraete, Berchem, Belgium

[73] Assignee: U.S. Philips Corporation, New York, N.Y.

[21] Appl. No.: 723,704

[22] Filed: Jun. 25, 1991

Related U.S. Application Data

[63] Continuation of Ser. No. 366,803, Jun. 14, 1989, abandoned.

[30] Foreign Application Priority Data

Nov. 17, 1988 [NL] Netherlands .......................... 8802833

[51] Int. Cl.⁵ .............................................. G06F 15/50
[52] U.S. Cl. .................... 364/444; 364/449; 340/995
[58] Field of Search ............ 364/443, 444, 424.02, 364/449; 180/167, 168, 169; 318/587; 340/990, 995

[56] References Cited

U.S. PATENT DOCUMENTS

| 4,301,506 | 11/1981 | Turco | 364/444 |
| 4,570,227 | 2/1986 | Tachi et al. | 364/444 |
| 4,777,416 | 10/1988 | George, II et al. | 364/424.02 |
| 4,796,189 | 1/1989 | Nakayama et al. | 340/995 |
| 4,817,000 | 3/1989 | Eberhardt | 364/443 |

OTHER PUBLICATIONS

R. Cooper et al., "The Average Time Until Bucket Overflow", ACM Trans. Database Sys., vol. 9, No. 3, Sep. 1984, pp. 392–408.

Hart et al., "A Formal Basis for the Heuristic Determination of Minimum Cost Paths", IEEE Trans. Science & Cybernetics, vol. SSC-4, No. 2, Jul. 1968, pp. 100–107.

Imai et al., "Practical Effects of Existing Shortest Path Algorithms and a New Bucket Algorithm", J. of Operations Rsch. Soc. of Japan, vol. 27, No. 1, Mar. 1984, pp. 43–57.

Knuth, *The Art of Computer Programming*, vol. 3, *Sorting & Searching*, (Addison-Wesley 1973).

*Primary Examiner*—Gary Chin
*Attorney, Agent, or Firm*—Anne E. Barschall

[57] ABSTRACT

A method of planning optimum routes on the basis of successively selected sub-sets of the total topographical and traffic information, so-called buckets, which method anticipates which buckets will be of importance in the near future for the calculation of the navigation data, and navigation system comprising a route planner for carrying out such a method.

15 Claims, 4 Drawing Sheets

5,170,353

BUCKET-ORIENTED ROUTE PLANNING METHOD, AND NAVIGATION SYSTEM COMPRISING A ROUTE PLANNER FOR CARRYING OUT SUCH A METHOD

This is a continuation of application Ser. No. 07/366,803, filed Jun. 14, 1989 now abandoned.

INTRODUCTION

Electronic navigation and information systems are being developed for use in the car. These systems can relieve the driver of a car or the passengers from the task of determining the best route to a destination. Notably for police, fire brigades, ambulances and the like it is very important not to lose time in searching for the best route, but also the average driver can save himself substantial annoyance by using such a system. The system may be useful not only in unknown surroundings, but also in known surroundings by planning a route which avoids traffic jams.

One of the major problems involved in the development of a nagivation and information system for cars is posed by the vast amount of topographical and traffic information required for route planning. This information must be stored and be readily accessible for processing in a processor.

The Compact Disc is a highly efficient medium for the storage of digital data: one CD can store 4800 Mbit. This is more than thousand times the storage capacity of the largest RAM semiconductor memory available at present. The access time of a CD is much shorter than that of a magnetic tape cassette, but longer than that of a semiconductor memory and it is certainly not negligibly short.

The invention relates to a method of determining an optimum route between a starting position and a destination position on the basis of topographical and traffic information by repeated selection of vectors and expansion of a search tree which contains vectors which form already planned sub-routes, to each vector there being assigned a weighting factor and for each sub-route there being determined a cumulative weighting factor by addition of the weighting factors of the vectors of the already planned sub-route.

The invention also relates to a navigation system comprising a route planner which includes:

a memory for the bucket-wise storage of topographical and traffic information;

an input/output unit for the input and output of information concerning starting position and destination position;

a processor which is programmed so that, via repeated selection of vectors and expansion of a search tree containing vectors which form already planned sub-routes, an optimum route is calculated from a given starting position to a given destination position on the basis of weighting factors assigned to each vector.

A method of this kind is known from the article "A formal basis for the heuristic determination of minimumcost paths" by Hart et al., IEEE Transactions of Systems Science and Cybernetics, Vol. SSC-4, No. 2, July 1968. On the basis of the weighting factors assigned, the criteria on the basis of which the route is optimised are tested: for example, minimum distance or minimum time.

Such a method and a navigation system operating on the basis of such a method have the drawback that the amount of data which must be continuously available for route planning in practice appears to be too large for a working memory to be used in conjunction with the method and the navigation system.

Therefore, it is an object of the invention to provide a method which determines optimum routes on the basis of successively selected blocks of sub-information and which anticipates which sub-information will be of importance for the calculations in the processor in the near future. To achieve this, a method in accordance with the invention is characterized in that the information is sub-divided into buckets, for the repeated selection of vectors and the expansion of the search tree there being used exclusively vectors from a predetermined maximum number of buckets which are selected from all buckets available, on the basis of an evaluation value which is determined by a sum of the weighting factors of the constituent vectors of an already planned sub-route and an estimated fictitious sub-route yet to be followed via the relevant bucket.

Thus, each time the instantaneously required information is selected for route planning.

A navigation system in accordance with the invention is characterized in that the memory comprises a background memory in which the bucket-wise organised topographical and traffic information is stored and also comprises a working memory whereto there are transferred from the background memory only the buckets which have been selected on the basis of an evaluation value which is determined by a sum of the weighting factors of the constituent vectors of an already planned sub-route and an estimated fictitious sub-route yet to be followed via the relevant bucket, only vectors from buckets in the working memory being used for the repeated selection of vectors and the expansion of the search tree.

It is thus achieved that the instantaneously required information is always present in the working memory.

DESCRIPTION OF THE INVENTION

A navigation and information system for cars such as, for example CARIN (Car Information and Navigation System) plans the best route, assists the driver by way of a speech synthesizer or a symbol display panel, periodically determines the position of the vehicle, selects an alternative route when traffic obstructions are signalled by encoded digital radio signals, and can also provide tourist information.

For the storage of the digital data representing the necessary topographical and traffic information, CARIN uses the Compact Disc.

Figure 1:
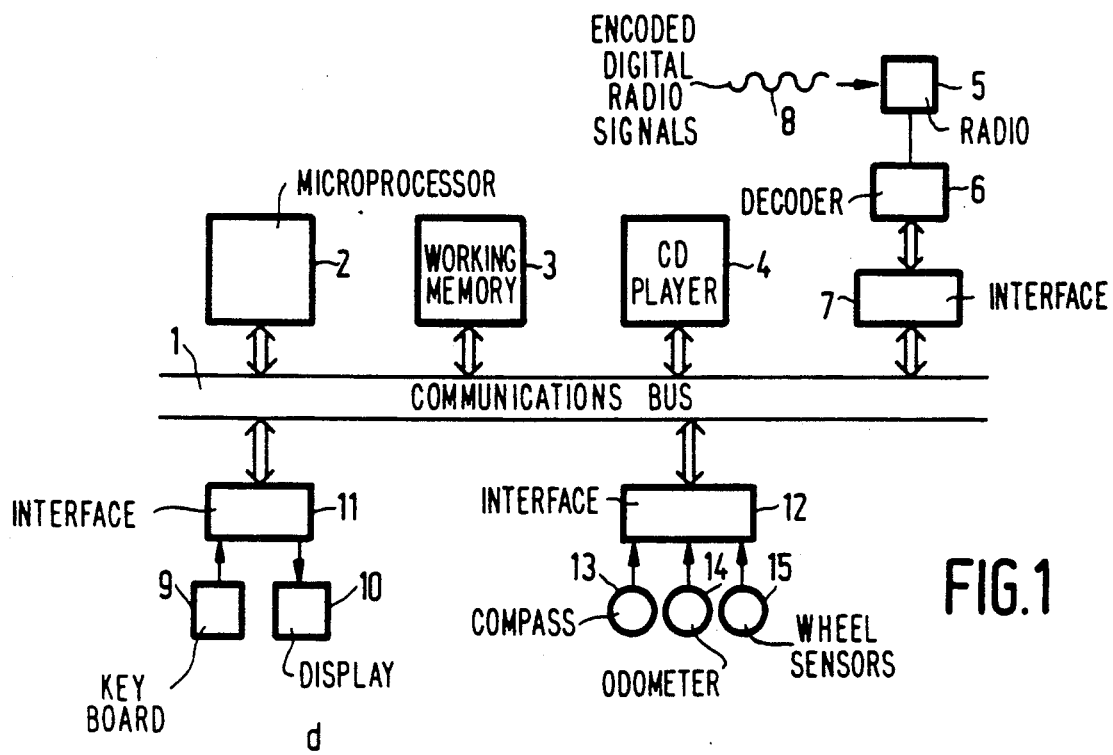
FIG. 1 shows a navigation system for a car.

FIG. 1 shows the navigation system for a car. A microprocessor 2, a working memory 3 which has a capacity of, for example 1 Mbyte, and a CD player 4 communicate with one another via a bus 1. In addition to the known radio signals, a radio 5 also receives encoded digital radio signals 8 containing traffic information. These signals are decoded in a decoder 6 which is connected to the bus 1 via an interface 7. A keyboard 9 communicates with the bus 1 via an interface 11, and also the display 10 which comprises a monitor and an electronic speech synthesizer with loudspeakers for reproducing topographical, traffic and navigation data. Via an interface 12, the microprocessor 2 determines the actual position of the vehicle with the aid of a compass 13 (for example, a fibre optic gyroscope), an odometer 14 and wheel sensors 15.

The topographical and traffic information can be digitised in various ways. For example, the raster scanning method is as follows. A map (for example, scale 1:100 000) is divided into pixels of, for example 0.1 mm × 0.1 mm. The colour of each pixel is represented by a digital code. Another method which requires substantially less storage capacity is the vector method. Therein, the axes of roads are approximated by straight-line segments, each of which represents a vector. An end of a vector satisfying given requirements is referred to as a node or 0-cell. A vector or series of vectors interconnecting two nodes is referred to as a chain or 1-cell. A surface area enclosed by chains is referred to as a 2-cell. The terms 0-cell, 1-cell and 2-cell are known from topology; see S. Lefschetz "Introduction to topology", Princeton University Press, Princeton, N.J., 1949. For the search algorithms to be described, it is assumed that digitising is performed by way of the vector method. Therefore, hereinafter each 1-cell is a vector and each vector is a 1-cell for the sake of simplicity.

As has already been stated, the Compact Disc is used as the storage medium for the system, notably a Compact Disc Interactive for which an international standard is being prepared. In addition to the digital data required, the CD-I disc will contain software. The storage capacity of a CD is 4800 Mbit. The semiconductor working memory of the computer has a capacity of only approximately 8 Mbit. It will take approximately one hour for reading all information of a CD, and approximately 6 seconds for filling the working memory completely with information supplied by a CD. The access time to the information of the CD is not negligibly short, so that the data cannot be read at the very instant at which they are required for navigation. In accordance with the invention, an anticipation is made as regards the sub-information which will be relevant for the navigation within the near future. To this end, the data must be stored on the CD as conveniently as possible: the information is sub-divided into buckets, preferably but not necessarily rectangular buckets. In order to minimise the access time, the buckets preferably contain approximately the same amount of data; moreover, buckets which are topographically situated near one another, preferably are also situated near one another on the CD.

A map can be sub-divided into buckets accordancing to various algorithms, for example the "region quadtree" algorithm where a rectangular map is repeatedly sub-divided into four rectangles until the amount of information in each rectangle drops below a given limit.

The arrangement on the CD of the buckets formed by the rectangles thus found is comparable with the translation of a two-dimensional structure into a one dimensional structure, see E. A. Patrick, D. R. Anderson and F. K. Bechtel "Mapping multidimensional space to one dimension for computer output display", IEEE Transactions C-17, 949–953, 1968. This can be realised by way of space-filling curves which are known from literature, see G. Peano, "Sur une courbe, qui remplit toute une aire plane", Math. Annalen 36, 157–160, 1890. Such a space-filling curve is suitable for the arrangement of buckets obtained by partitioning using the "region quadtree" algorithm. This is because buckets situated near one another are often also situated near one another on the curve, so that the fetching of information concerning such a near region requires little time.

Furthermore, an efficient structure is required within each bucket for efficient treatment of the information read from the CD. The addresses in the memory containing the data for the 0-, 1- and 2-cells are linked by way of lists which use pointers for coupling the various memory locations.

Figure 2:
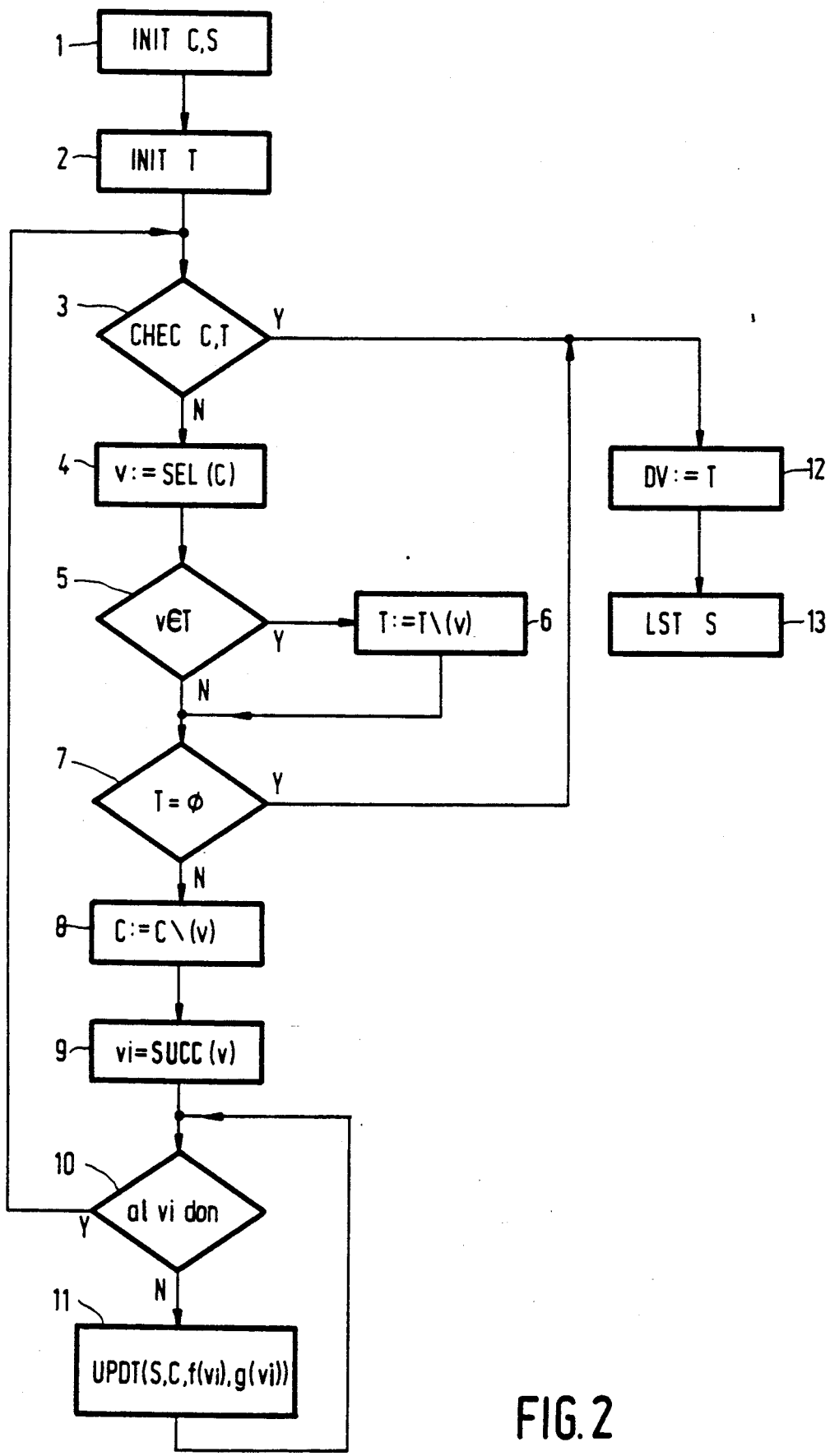
FIG. 2 shows a flowchart of the known search algorithm.

FIG. 2 shows a flowchart of the search algorithm which is known from the article "A formal basis for the heuristic determination of minimum cost paths" by Hart et al., IEEE Transactions of Systems Science and Cybernetics, Vol. SSC-4, No. 2, July 1968. The information is derived from the entire memory. The algorithm operates on the basis of repeated selection of vectors from a candidate list C and expansion of a search tree S which contains vectors v which form already planned sub-routes. To each vector v there is assigned a weighting factor $R(v) >= 0$, for example the corresponding distance or the estimated period of time required for travelling the relevant distance. Thus, for each vector a cumulative weighting factor $g(v)$ of the already planned path to the vector v is determined, and an estimate $h(v)$ is made for the total weighting factor of the optimum path between the vector v and the destination. The sum of $g(v)$ and $h(v)$, referred to as $f(v)$, is an evaluation value of the vector v. The evaluation value $f(b)$ of a bucket b is defined as the most attractive evaluation value of the vectors in the bucket b which are listed on the candidate list C. Denote a vector for which this best value is assumed as $v_b$. Given a list BV of source or starting vectors with corresponding f, g and h values, and a list DV of target or destination vectors, the algorithm finds an optimum path to one of the sources for each target, provided such an optimum path exists. Use is made of three data structures: the candidate list C, the list T containing targets not yet found, and the list S containing vectors which are or were listed on the candidate list C (the search tree).

During the execution of the algorithm, in block 1 first the candidate list C and the search tree S are initialised: C is filled with all source vectors and S is filled with all source vectors with their associated f, g and h values and an empty field for registering a pointer indicating the relationship with other vectors which together constitute a planned sub-route. In block 2, the list T with targets not yet found is initialised: T becomes the target list DV. In this respect it is assumed that BV and DV have an empty cross-section. The list T will be simply referred to hereinafter as the search list. In block 3 it is checked whether at least one of the two lists C and T is empty. If this is the case, the search is terminated: if the candidate list C is empty and the search list T is not empty, some targets cannot be reached; when the search list T is empty, an optimum path has been found to all target vectors. In block 12 the target list DV is modified into the search list T with targets not found (this list may possibly be empty). In block 13 the search tree S is output, necessary for following the optimum path by way of pointers. For as long as the candidate list C and the search list T are not empty, the loop formed by the blocks 3–11 is followed. In block 4 the vector v having the most attractive evaluation value is selected from the candidate list C. In block 5 is checked whether this vector v is contained in the search list T. If this is the case, the vector v is removed from the search list T in block 6 because the target has been found. Subsequently in block 7 it is checked whether the search list T is empty. If so, an optimum path to all targets has been found, the search is terminated and the program is continued in block 12. If not, the vector v is removed from the candidate list C in block 8. In block 9 the successors to the vector v are determined: these are the vectors $v_i$ related to the vector v. In block 11 it is determined for each successor $v_i$ whether the new path including the vector $v_i$ is better than an already existing path including the vector $v_i$; if so, the search tree S, the candidate list C, the evaluation value $f(v_i)$ and the cumulative weighting factor $g(v_i)$ are adapted as will be described hereinafter. To this end, each time the next vector $v_i$ is selected in block 10. When all vectors have been dealt with, the program continues in the block 3.

Figure 3:
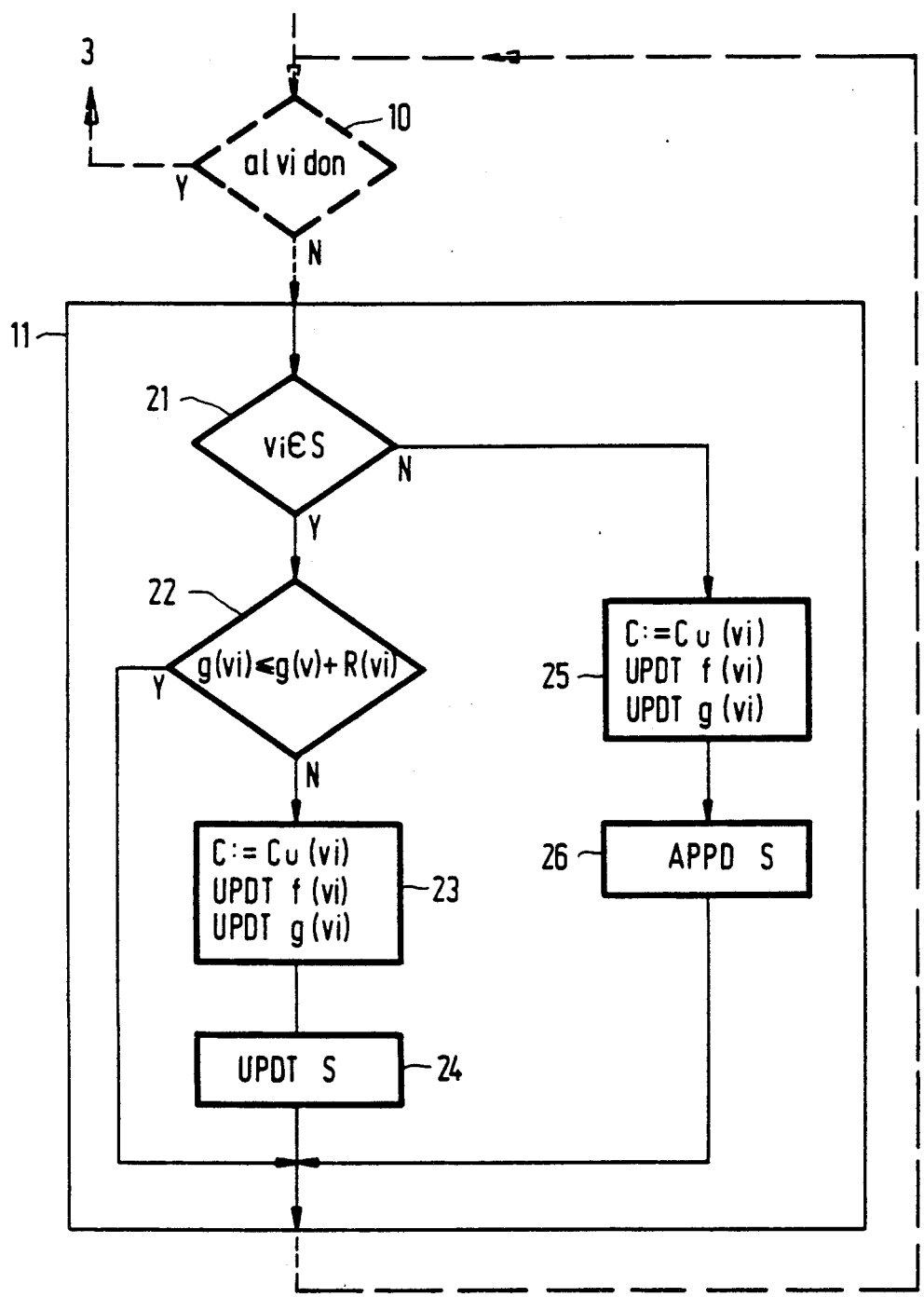
FIG. 3 is a detailed representation of a part of the search algorithm.

FIG. 3 is a more detailed representation of the block 11. In block 21 it is checked whether the vector $v_i$ is present in the search tree S. If so, in block 22 the cumulative weighting factor of the new path, being $g(v)+R(v_i)$, is compared with the cumulative weighting factor of the previously found path $g(v_i)$. Therein $R(v_i)$ is the weighting factor of the vector $v_i$. When the new path is more attractive, in block 23 the vector $v_i$ is added to the candidate list C and the associated evaluation value $f(v_i)$ and cumulative weighting factor $g(v_i)$ are adapted. In that case the search tree S is adapted in block 24: new values for f and g are added to the vector $v_i$ and also the pointer which indicates, by back reference in the tree, the path planned thus far between the vector $v_i$ and the sources. If no better value was found in the block 22, the block 11 (FIG. 2) is abandoned. If it is found in the block 21 that the vector $v_i$ is not present in the search tree S, the vector $v_i$ is added to the candidate list C in block 25, and the evaluation value $f(v_i)$ and the cumulative weighting factor $g(v_i)$ are adapted. In block 26 the search tree S is then adapted: the vector $v_i$ is added with its f, g and h values, and also the pointer for back reference. The loop formed by the blocks 10 and 11 is followed until all successors $v_i$ to the vector v have been examined.

The described algorithm produces in an optimum path to the targets, subject to the condition that the evaluation function satisfies given requirements. For proof in this respect reference is made to the cited article by Hart et al.

The bucket oriented search algorithm proposed by the invention deviates from the known algorithm in the following respects. A number of buckets is temporarily locked and a search is made only in the locked buckets. The buckets to be locked are selected as follows. The buckets which overlap the candidate list C together form the candidate bucket list BC. As has already been stated, these buckets have an evaluation value: the most attractive evaluation value of the vectors in the relevant bucket listed on the candidate list C. Initially an as large as possible number of candidate buckets (limited by the maximum available storage space) having the most attractive evaluation values can be locked in the working memory. During each subsequent determination of the buckets to be locked, given a number of candidate buckets present in the working memory, an evaluation value is calculated also for all adjacent buckets (to be described hereinafter). The candidate buckets constitute, together with the neighbour buckets of the candidate buckets in the memory, the bucket request list BR. On the basis of the evaluation values calculated, from this list the buckets are selected to be locked in the working memory. The determination of the locked buckets will be regularly performed during the execution of the search algorithm.

The vectors on the candidate list C which are not present in a locked bucket are temporarily removed from the list in order to be placed on a waiting list. As a result, the paths found to the targets need not be optimum, because the candidate vectors were not expanded in order of evaluation value as is necessary in order to obtain optimum results in accordance with Hart et al. When a target is reached, therefore, it may be that a better path exists which has not yet been found. Therefore, in order to ensure optimum results, the search must be continued.

During the search, at any instant only the path associated with the candidate vector having the instantaneous most attractive evaluation value is optimum, because all vectors which have had a more attractive evaluation value have been checked and resulted in paths having a less attractive evaluation value. A target vector on the candidate list, therefore, can be removed therefrom only if all other vectors on the candidate list have a less attractive evaluation value. Thus, the search must be continued until all vectors on the candidate list have a less attractive evaluation value than all target vectors. Vectors on the candidate list which have a less attractive evaluation value than all target vectors can never result in a better path, so that they may be removed; this is because the evaluation value f is monotonically non-descending during the search (see Hart et al.).

Figure 4:
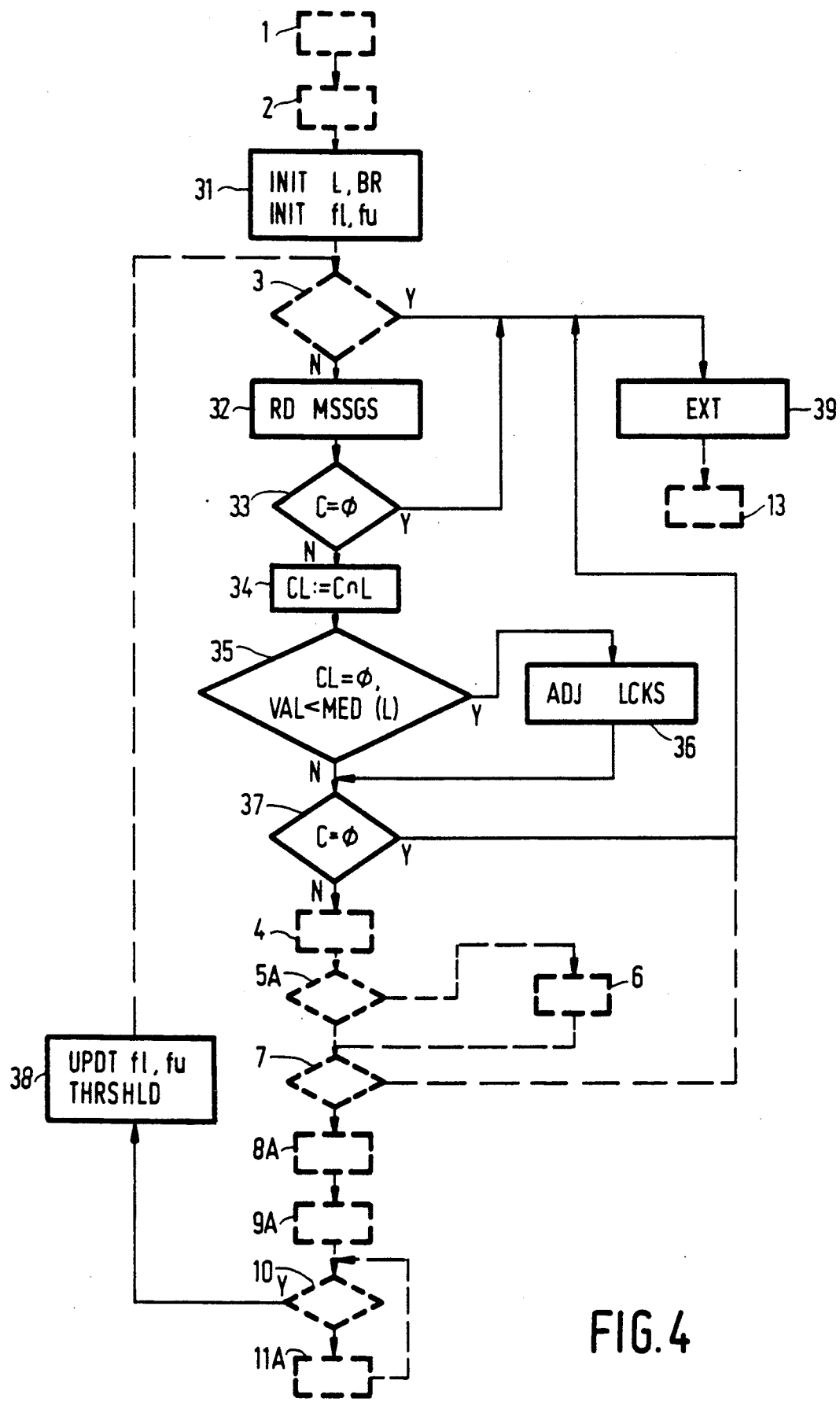
FIG. 4 shows a flowchart of the modified search algorithm.

FIG. 4 shows a flowchart of the modified search algorithm. As has already been stated, this algorithm checks only the candidate vectors present in the locked buckets (list L). The steps corresponding to the algorithm of FIG. 2 are denoted by a dashed line, the new steps being denoted by a non-interrupted line. The new steps will be described hereinafter.

In block 31 the list L with the locked buckets and the bucket request list BR are initialised so as to be empty, and the most attractive f value of the candidate list C, referred to as $f_l$, and then least attractive f value of the search list T, referred to as $f_u$, are determined. In block 32 either error messages are read, after which all vectors which are present in an "incorrect" (for example, illegible) bucket are removed from the candidate list C, or messages concerning the writing of a bucket into the memory are read. When in the latter case an available bucket b is not present in the list L of locked buckets, its evaluation value f(b) is compared with the best evaluation value of the row of messages thus far, referred to as vlu. If necessary, vlu is adapted. In block 33 it is checked whether the candidate list C is empty. If the candidate list C is empty due to error messages in the block 32, in block 39 the non-reached target vectors are removed from the target list DV, the correct cumulative evaluation values are assigned to the target vectors reached, and the locked buckets are released. If the candidate list C is not empty, a filtered candidate list CL is formed in the block 34 by testing which elements of the candidate list C are present in the list L of locked buckets. In block 35 it is subsequently checked whether the filtered candidate list CL is empty or whether said evaluation value vlu in the block 32 has obtained a value which is more attractive than the median of the evaluation values of the buckets on the list L of locked buckets, meaning that an important new bucket has been read. If at least one of these two conditions is satisfied, the following takes place in block 36. All locked buckets are released and the candidate bucket list BC, the bucket request list BR, the list of locked buckets L and the filtered candidate list CL are determined again, after which, once the filtered candidate list CL has become empty, the writing of a bucket into the memory is awaited; this procedure is repeated until CL is not empty or C is empty. Subsequently, in block 37 it is checked whether the candidate list C is empty. If so, the procedure goes to block 39; if not, it proceeds to the block 4. Some blocks have only been slightly modified; they will be denoted hereinafter by the reference numeral used in FIG. 2, supplemented by the letter "A". In block 5A it is checked whether the vector v is present in the search list T and also has the most attractive evaluation value of all vectors on the candidate list C. If both conditions are satisfied, the vector v can be removed from the search list T. In block 8A the vector v is removed not only from the candidate list C but also from the filtered candidate list CL. In block 9A the successors to the vector v which are situated within a given bucket are determined. Block 11A deviates from the block 11 in that, if the bucket of the vector $v_i$ is present in L, the vector $v_i$ is also added to the filtered candidate list CL before being added to the candidate list C (in two locations in block 11). In block 38, $f_l$ and $f_u$ are adapted to the new candidate list C and the search list T, respectively and vectors which have a less attractive evaluation value than $f_u$ and target vectors which have a better evaluation value than $f_l$ are removed from the candidate list C or the filtered candidate list CL. However, they remain in the search tree S. Finally in block 39 the target vectors which have not been reached are removed from the target list DV, the correct cumulative evaluation values are assigned to the target vectors which have been reached, and the locked buckets are released.

Because the vehicle is constantly in motion, the source vector continuously changes during the search. Therefore, it is handy to search in the reverse direction, i.e. to determine a route from the fixed target back to the actual position of the vehicle.

Figure 5:
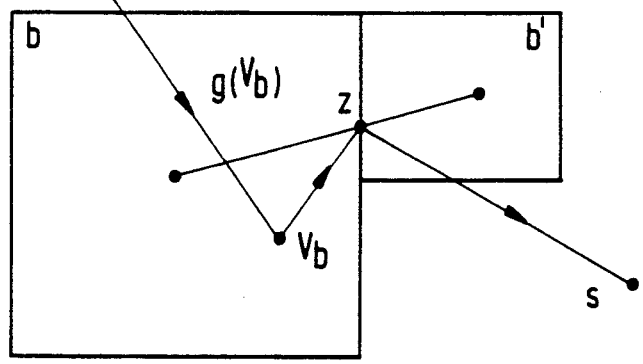
FIG. 5 illustrates the determination of an evaluation value for a neighbouring bucket of a candidate bucket in the working memory.

A version of the determination of the buckets to be locked will be described hereinafter. As already mentioned, the buckets which overlap the candidate list C together constitute the candidate bucket list BC. For all adjoining buckets of the candidate buckets locked in the working memory at any instant an evaluation value is determined as follows (see FIG. 5). The connecting line between the centres of the actual bucket b and the relevant neighbouring bucket b' intersects the common boundary, or the prolongation thereof, at a point z. The evaluation value f(b') of the neighbouring bucket b' is defined as:

$$f(b') = g(v_b) + h(v_b, z) + h(z)$$

where $v_b$ is the vector in the bucket b on the candidate list which has the most attractive evaluation value (assuming that only one such vector exists), $f(v_b) = f(b)$, $g(v_b)$ is the cumulative weighting factor of an already planned sub-route from the vector $v_b$ to the target d, $h(v_b, z)$ is the weighting factor of an idealised straight path between the end point of the vector $v_b$ and the point z, and h(z) is the weighting factor of an idealised straight path between the point z and the actual position s of the vehicle.

If there are several vectors having the most attractive evaluation value for the bucket b, for example the vector situated nearest to the point z can be selected.

When a bucket b' neighbours several locked buckets the most attractive value for f(b') is selected.

Figure 6:
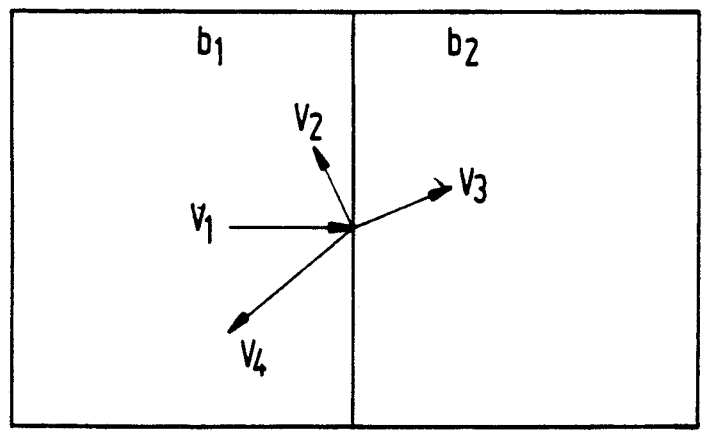
FIG. 6 diagrammatically shows a map segment in which a vector touches a bucket boundary.

For the determination of the successors to a vector v, the following problem may arise in the bucket oriented algorithm. When the vector v touches the boundary of a bucket, one or more successors may be situated in a neighbouring buckets which may not have been locked in the working memory. This can be solved as described with reference to FIG. 6.

Vector $v_1$ of bucket $b_1$ touches the boundary of the buckets $b_1$ and $b_2$. During the determination of the successors to $v_1$ (denoted by so-called thread pointers), as soon as a successor $v_3$ is situated in a non-locked neighbouring bucket $b_2$, the vector $v_1$ with a pointer to $v_3$ is added to the candidate list C. This pointer indicates that the interrupted determination of the successors to $v_1$ must be continued as from $v_3$ as soon as the bucket $b_2$ has been read and locked. When this is the case, the determination of the successors to $v_1$ must be interrupted again at $v_4$ if $b_1$ were no longer locked.

By assigning an "infinitely attractive" evaluation value to the vector with pointer added to the candidate list C upon each interruption, it is ensured that, as soon as the neighbouring bucket has been read, it is locked and the determination of the successors continues until they have all been generated and examined.

When the vehicle is in motion, the actual position does not correspond to the stated starting position for which an optimum route is searched. When the actual position is reached by the search tree at a given instant during this search, the search may be interrupted. When the actual position is situated outside the generated search tree after the determination of the optimum route to the stated starting position, the search must be continued until the search tree has reached the actual position.

I claim:

1. A method of determining an optimum route between a starting position and a destination position on the basis of topographical and traffic information by repeated selection of vectors and expansion of a search tree which contains previously selected vectors which form already planned sub-routes, the method comprising:

(a) assigning a respective weighting factor to each of the vectors and determining a cumulative weighting factor for each respective one of the already planned sub-routes by adding the weighting factors of the vectors of the respective one of the already planned sub-routes;

(b) sub-dividing the topographic and traffic information into a number of buckets in a background memory wherein the number of buckets is the total available buckets;

(c) determining a maximum number of buckets from the total available buckets for transfer to a working memory based on an evaluation value obtained by summing i) the cumulative weighting factor of at least one of the already planned sub-routes; and ii) the weighting factor of at least one vector of a proposed sub-route within a relevant bucket;

(d) selecting a vector to add to the search tree wherein the vector is selected from within the working memory, whereby the search tree is expanded; and (e) outputting the optimum route based on a best one of the sub-routes in the search tree when all vectors have been searched.

2. A method of determining an optimum route as claimed in claim 1, comprising the steps of determining said evaluation value for a bucket in the working memory by selecting the most attractive evaluation value of all vectors in the relevant bucket which are listed on a candidate list, and determining said evaluation value for a neighboring bucket of the bucket in the working memory by adding the weighting factor of an idealized straight path between a current position and a point z which is a point intersection of a connecting line between centers of said bucket and said neighboring bucket and a common boundary or an extension of the common boundary of said bucket and said neighboring bucket, the weighting factor of an idealized straight path between said point z and an end point of a vector $v_b$ in said bucket, and the cumulated weighting factor of an already planned sub-route from said vector $v_b$ to a target vector.

3. A method of determing an optimum route as claimed in claim 2, comprising the step of selecting the vector $v_b$ that has the most attractive evaluation value of all vectors in said bucket which are listed on the candidate list.

4. A method of determining an optimum route as claimed in claim 3, comprising the step of selecting the vector $v_b$ which is situated nearest to said point z, from several vectors in a bucket which are listed on the candidate list as having the most attractive evaluation value.

5. A method of determining an optimum route as claimed in claim 2, comprising the step of selecting, as the most attractive evaluation value, the evaluation value of a neighboring bucket adjoining several buckets in the working memory.

6. A method of determining an optimum route as claimed in claim 3, comprising the step of selecting, as the most attractive evaluation value, the evaluation value of a neighboring bucket adjoining several buckets in the working memory.

7. A method of determining an optimum route as claimed in claim 4, comprising the step of selecting, as the most attractive evaluation value, the evaluation value of a neighboring bucket adjoining several buckets in the working memory.

8. The method of claim 1, wherein the background memory is a compact disc.

9. A navigation system including a route planner having a memory for bucket storage of topographical and traffic information;

an input/output unit for inputting and outputting information concerning a given starting position and a given destination position; and a processor which is programmed so that, via repeated selection of vectors and expansion of a search tree containing previously selected vectors which form already planned sub-routes, an optimum route is calculated from the given starting position to the given destination position based on weighting factors assigned to each vector, wherein the improvement comprises that the memory includes:

(a) a background memory in which the bucket organized topographical and traffic information is stored; and (b) a working memory for receiving from the background memory buckets selected based on an evaluation value which is determined by a sum of the weighting factors of the vectors of:

i) at least one of the already planned sub-routes and ii) a proposed sub-route, the proposed sub-route including at least one vector from at least one of the selected buckets, such that only vectors from the selected buckets in the working memory are used for the repeated selection of the vectors and the expansion of the search tree.

10. A navigation system as claimed in claim 9, further comprising:

(a) means for determining an actual position of an object whose route is to be planned; and (b) means for comparing the actual position with positions on routes found, such that the route planner continues a search when non-correspondence is found by said means for comparing and terminates the search when correspondence is found by said means for comparing.

11. A navigation system as claimed in claim 9, wherein the working memory is for storing:

a candidate list with vectors to be selected for expansion, a search tree list with vectors already examined and their evaluation values and pointers, a search list with target vectors not yet found, a candidate bucket list with buckets which overlap the candidate list, a bucket request list with both candidate buckets and neighboring buckets of those candidate buckets already in the working memory, a locked bucket list with buckets which are locked in the working memory, and a filtered candidate list with candidate list vectors present in one of the locked buckets.

12. The system of claim 9, wherein the background memory is a compact disc.

13. A method for determining an optimum route between a starting position and a destination position on the basis of topographical and traffic information comprising the steps of a) storing the topographical and traffic information in buckets in a background memory in the form of vectors and weighting values associated with the vectors;

b) loading some of the buckets into a working memory based on a first evaluation value which is a sum of weighting values of at least one already planned sub-route and estimated values associated with the buckets;

c) searching vectors within the working memory based on a second evaluation value which is a sum of i) the weighting value of at least one currently searched sub-route which is one of the at least one already planned sub-route, said at least one currently searched sub-route leading to a currently searched vector; and ii) the weighting value associated with the currently searched vector;

d) designating the optimum route, based on a combination of i) one of the at least one currently searched sub-route;

ii) the currently searched vector; and iii) a target vector which leads to the destination position.

14. The method of claim 13, wherein the background memory is a compact disc.

15. The method of claim 13 further comprising prior to the loading step, initializing a search tree for containing the at least one already planned sub-route, and as part of the designating step, repeating the loading and searching steps until the already planned sub-route leading to the currently searched vector when combined with the currently searched vector forms the optimum route.

* * * * *